United States Patent
Ihara et al.

(10) Patent No.: US 11,544,118 B2
(45) Date of Patent: Jan. 3, 2023

(54) INFORMATION PROCESSING APPARATUS, INFORMATION PROCESSING SYSTEM, AND NON-TRANSITORY COMPUTER-READABLE STORAGE MEDIUM FOR STORING COMMUNICATION MANAGEMENT PROGRAM

(71) Applicant: FUJITSU LIMITED, Kawasaki (JP)

(72) Inventors: Nobutaka Ihara, Kawasaki (JP); Takahiro Kawashima, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 139 days.

(21) Appl. No.: 16/942,819

(22) Filed: Jul. 30, 2020

(65) Prior Publication Data
US 2021/0089365 A1 Mar. 25, 2021

(30) Foreign Application Priority Data
Sep. 20, 2019 (JP) .............................. JP2019-172032

(51) Int. Cl.
*G06F 9/46* (2006.01)
*G06F 9/52* (2006.01)

(52) U.S. Cl.
CPC .................................... *G06F 9/522* (2013.01)

(58) Field of Classification Search
CPC ....................................................... G06F 9/522
See application file for complete search history.

(56) References Cited

U.S. PATENT DOCUMENTS

| 7,437,521 | B1 | 10/2008 | Scott et al. | |
|---|---|---|---|---|
| 2006/0212868 | A1* | 9/2006 | Takayama | G06F 9/522 718/100 |
| 2012/0254881 | A1* | 10/2012 | Hamamoto | G06F 9/522 718/102 |

(Continued)

FOREIGN PATENT DOCUMENTS

| JP | H04-223533 A | 8/1992 |
|---|---|---|
| JP | 2004-227188 A | 8/2004 |

OTHER PUBLICATIONS

Sampson, Jack et al.,"Exploiting Fine-Grained Data Parallelism with Chip Multiprocessors and Fast Barriers", 2014 47th Annual IEEE/ACM International Symposium on Microarchitecture; [Proceedings of the Annual ACM/IEEE International Symposium on Microarchitecture], IEEE Computer Society, 1730 Massachusetts Ave., NW Washington, DC 20036-1992 USA, Dec. 9, 2006, pp. 235-246, XP058106982.

(Continued)

*Primary Examiner* — Tammy E Lee
(74) *Attorney, Agent, or Firm* — Fujitsu Patent Center (57) ABSTRACT

One embodiment provides an information processing apparatus effective to execute a parallel job in coordination with other information processing apparatuses. In an example, the information processing apparatus includes: a memory configured to store computer readable instructions; and a processor configured to execute the computer readable instructions sored in the memory, the computer readable instructions including: providing an instruction to issue barrier communication of error information; and propagating the error information to each of the other information processing apparatuses based on the instruction for the barrier communication.

6 Claims, 11 Drawing Sheets

(56) References Cited

U.S. PATENT DOCUMENTS

2019/0121387 A1   4/2019   Knowles et al.

OTHER PUBLICATIONS

Brady, C. S. et al., "Introduction to MPI", Dec. 18, 2018, XP055764545, Retrieved from the Internet: URL:https://warwick.ac.uk/research/rtp/sc/rse/training/intrompi/IntroductiontoMPI.pdf [retrieved on Jan. 12, 2021], pp. 1-54.

Extended European Search Report dated Jan. 26, 2021 for corresponding to European Patent Application No. 20188076.2, 9 pages.

\* cited by examiner

INFORMATION PROCESSING APPARATUS, INFORMATION PROCESSING SYSTEM, AND NON-TRANSITORY COMPUTER-READABLE STORAGE MEDIUM FOR STORING COMMUNICATION MANAGEMENT PROGRAM

CROSS-REFERENCE TO RELATED APPLICATION

This application is based upon and claims the benefit of priority of the prior Japanese Patent Application No. 2019-172032, filed on Sep. 20, 2019, the entire contents of which are incorporated herein by reference.

FIELD

The embodiments discussed herein are related to an information processing apparatus, an information processing system, and a non-transitory computer-readable storage medium storing a communication management program.

BACKGROUND

In a parallel program in high performance computing (HPC) or the like, a communication library such as a message passing interface (MPI) library is used in many cases when data is transmitted and received between nodes.

In the HPC or the like, when it is required to input a job having a high priority, a node resource is released by temporarily stopping the job having a low priority and saving required information, and the saved information is restored after the job having a high priority is executed. Then, a technology for restarting a job from a process having stopped the temporarily stopped job has been used, and functions such as job migration, job freezing, and job swapping have been developed.

When a process of temporarily stopping a job using internode data communication not including barrier communication is started, a library (for example, a communication library such as an MPI) that has performed communication stores information on each process. Accordingly, a restart position of the process may be uniquely determined regardless of states of the other nodes. When the barrier communication uses a hardware function, the state of each process is notified and the state of each process is determined, so that the restart position for the job may be determined.

Examples of the related art include Japanese Laid-open Patent Publication No. 04-223533 and Japanese Laid-open Patent Publication No. 2004-227188.

SUMMARY

According to an aspect of the embodiments, provided is an information processing apparatus effective to execute a parallel job in coordination with other information processing apparatuses. In an example, the information processing apparatus includes: a memory configured to store computer readable instructions; and a processor configured to execute the computer readable instructions cored in the memory, the computer readable instructions including: providing an instruction to issue barrier communication of error information; and propagating the error information to each of the other information processing apparatuses based on the instruction for the barrier communication.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

However, after barrier communication is stopped during job swapping, if states of processes are not identified by each other at a software level, the temporal stopping of the job may not be processed due to swap-out, and the restart position of the job after swap-in may not be determined.

In one aspect, the purpose to stop barrier communication at a high speed.

Hereinafter, an embodiment will be described with reference to the drawings. However, the following embodiment is merely an example and it is not intended to exclude application of various modifications and techniques not explicitly described in the embodiment. That is, various modifications may be made without departing from the spirit of the present embodiment.

Further, each drawing is not intended to include only constituent elements illustrated in the drawings and may include other functions and the like.

Hereinafter, the same reference signs indicate the same components in the drawings, and duplicate description thereof is omitted.

[A] Example of Embodiment

[A-1] Example of System Configuration

Communication used as a parallel job process is roughly classified into one to-one data communication between nodes and one-to-many barrier communication for synchronization between nodes.

The barrier communication of the parallel processes in an example of the present embodiment is realized by calling a barrier function in a program to be synchronized by all processes to be synchronized. For example, in an MPI library, setting of the barrier communication, issuance of barrier communication, and identification of completion of the barrier communication are mainly performed by an MPI_Barrier function, and the program is not previously processed until all the processes identify the completion of the barrier communication, so that the processes may be synchronized with each other.

Figure 1:
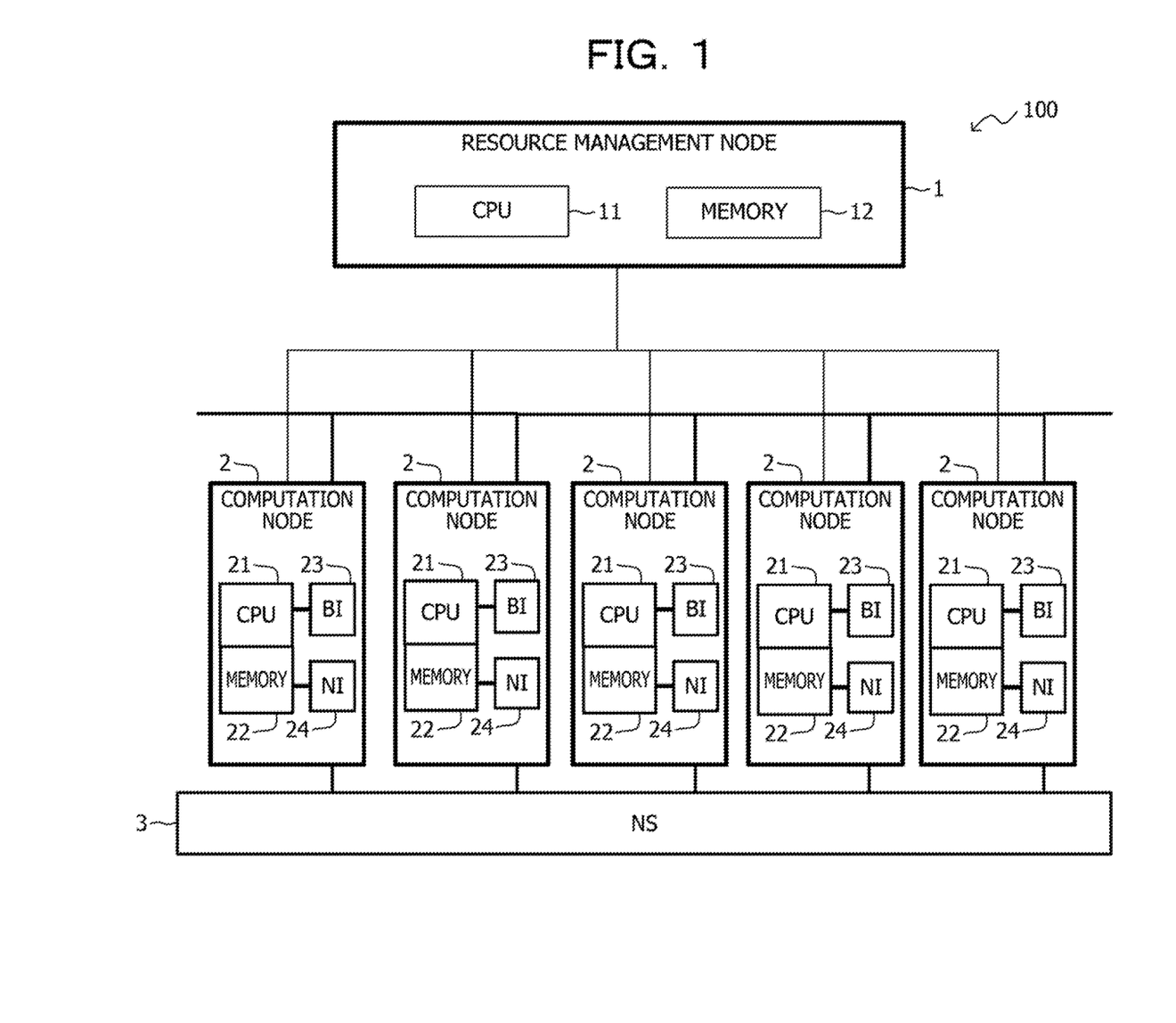
FIG. 1 is a block diagram illustrating a configuration example of an information processing system as an example of an embodiment.

FIG. 1 is a block diagram illustrating a configuration example of an information processing system 100 in the example of the embodiment.

The information processing system 100 includes a resource management node 1, a plurality of (in the illustrated example, five) computation nodes 2, and a network switch (NS) 3. The resource management node 1 is communicably coupled to each computation node 2. Further, the computation node 2 is connected to another computation node 2 and is coupled to another computation node 2 via the NS 3.

The resource management node 1 includes a central processing unit (CPU) 11 and a memory 12.

The memory 12 is exemplarily a storage device including a read-only memory (ROM) and a random-access memory (RAM). A program such as a Basic Input/Output System (BIOS) may be written to the ROM of the memory 12. A software program of the memory 12 may be appropriately loaded into and executed by the CPU 11. Further, the RAM of the memory 12 may be used as a primary recording memory or a working memory.

Figure 2:
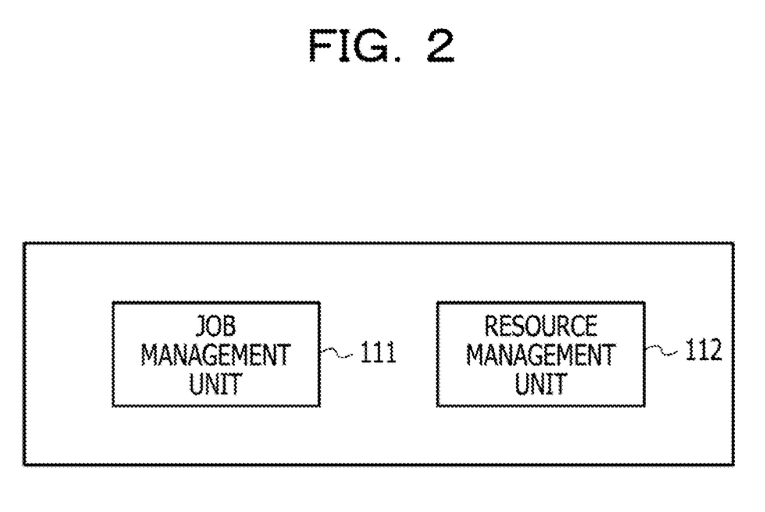
FIG. 2 is a block diagram schematically illustrating a functional configuration example of a resource management node illustrated in FIG. 1.

FIG. 2 is a block diagram schematically illustrating a functional configuration example of a resource management node 1 illustrated in FIG. 1.

For example, the CPU 11, which is a processing device that executes various controls and computations, realizes various functions by executing an operating system (OS) and a program stored in the memory 12. That is, as illustrated in FIG. 2, the CPU 11 may function as a job management unit 111 and a resource management unit 112.

A program for realizing functions of the job management unit 111 and the resource management unit 112 may be provided in a form in which the program is recorded in a computer-readable recording medium such as a flexible disk, a compact disk (CD, such as a CD-ROM, a CD readable (CD-R), or a CD rewritable (CD-RW)), a digital versatile disk (DVD, such as a DVD-ROM, a DVD-RAM, a DVD recordable (DVD-R, DVD+R), a DVD rewritable (DVD-RW, DVD+RW), or a high-definition DVD (HD DVD)), a Blu-ray disk, a magnetic disk, an optical disk, and a magneto-optical disk. Then, a computer (in the present embodiment, the CPU 11) may read the program from the above-described recording medium via a reading device not illustrated, transfer and store the read program to an internal recording device or an external recording device, and use the program. Further, the program may be recorded in a storage device (recording medium) such as a magnetic disk, an optical disk, and a magneto-optical disk and may be provided from the storage device to the computer via a communication path.

When the functions of the job management unit 111 and the resource management unit 112 are realized, the programs stored in the internal storage device (in the present embodiment, the memory 12) may be executed by the computer (in the present embodiment, the CPU 11). Further, the computer may read and execute the program recorded in the recording medium.

The job management unit 111 receives input of a job from a user 4 (described later with reference to FIG. 11) and issues a swap-out execution request to the resource management unit 112.

The resource management unit 112 determines whether or not swap-out is possible in each computation node 2, and when the swap-out is possible, deactivates the job and executes the swap-out in each computation node 2.

For example, the CPU 11 controls the entire operations of the resource management node 1. A device for controlling the entire operations of the resource management node 1 is not limited to the CPU 11, but may be any one of, for example, an MPU, a DSP, an ASIC, a PLO, and an FPGA. Further, the device for controlling the entire operations of the resource management node 1 may be a combination of two or more of a CPU, an MPU, a DSP, an ASIC, a PLO, and an FPGA. The MPU is an abbreviation for a microprocessor unit, the DSP is an abbreviation for a digital signal processor, and the ASIC is an abbreviation for an application-specific integrated circuit. Further, the PLO is an abbreviation for a programmable logic device, and the FPGA is an abbreviation for a field-programmable gate array.

As illustrated in FIG. 1, each computation node 2 is an example of an information processing apparatus, and includes a CPU 21, a memory 22, a barrier interface (BI) 23, and a network interface (NI) 24.

The NI 24 relays communication with other computation nodes 2 via the NS 3.

The BI 23 relays direct communication with other computation nodes 2.

The memory 22 is, for example, a storage device including a ROM and a RAM. The program such as a BIOS may be written in the ROM of the memory 22. The software program of the memory 22 may be appropriately loaded into and executed by the CPU 21. Further, the RAM of the memory 22 may be used as a primary recording memory or a working memory.

Figure 3:
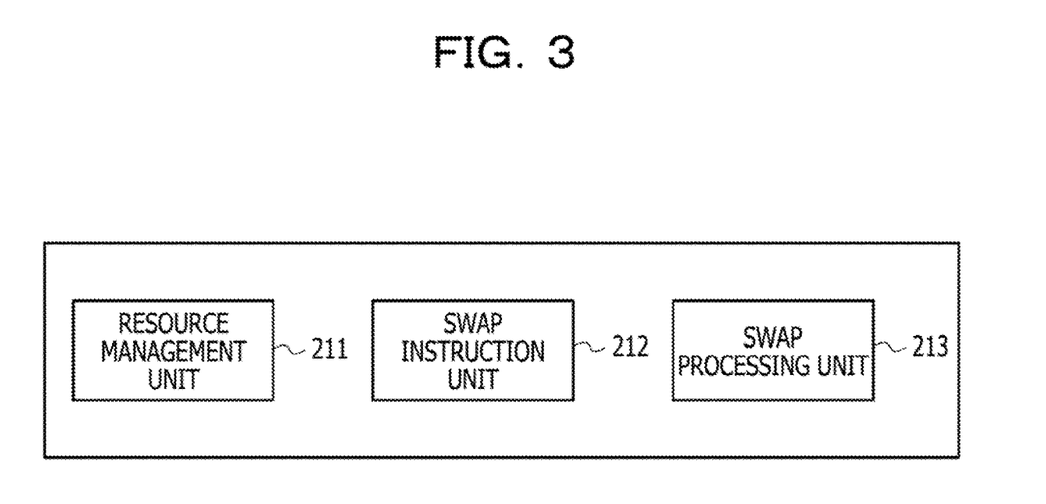
FIG. 3 is a block diagram schematically illustrating a functional configuration example of a computation node illustrated in FIG. 1.

FIG. 3 is a block diagram schematically illustrating a functional configuration example of the computation node 2 illustrated in FIG. 1.

For example, the CPU 21, which is a processing device that performs various types of control and various computations, realizes various functions by executing an OS and a program stored in the memory 22. That is, as illustrated in FIG. 3, the CPU 21 may function as a resource management unit 211, a swap instruction unit 212, and a swap processing unit 213.

A program for realizing functions of the resource management unit 211, the swap instruction unit 212, and the swap processing unit 213 may be provided in a form in which the program is recorded in a computer-readable recording medium such as a flexible disk, a CD (such as a CD-ROM, a CD-R, or a CD-RW), a DVD (such as a DVD-ROM, a DVD-RAM, a DVD-R, DVD+R, a DVD-RW, DVD+RW, or an HD DVD), a Blu-ray disk, a magnetic disk, an optical disk, and a magneto-optical disk. Then, a computer (in the present embodiment, the CPU 21) may read the program from the above-described recording medium via a reading device that is not illustrated, transfer and store the read program to an internal recording device or an external recording device, and use the program. Further, the program may be recorded in a storage device (recording medium) such as a magnetic disk, an optical disk, and a magneto-optical disk and may be provided from the storage device to the computer via a communication path.

When the functions of the resource management unit 211, the swap instruction unit 212, and the swap processing unit 213 are realized, the program stored in the internal storage device (in the present embodiment, the memory 22) may be executed by the computer (in the present embodiment, the CPU 21). Further, the computer may read and execute the program recorded in the recording medium.

The resource management nit 211 executes swap-out in each computation node 2.

The swap instruction unit 212 instructs deactivation of the job in response to a request from the resource management node 1. Details of the swap instruction unit 212 will be described later with reference to FIG. 8 and the like.

The swap processing unit 213 deactivates the job and stops the barrier communication. Details of the swap processing unit 213 will be described later with reference to FIGS. 8 and 9 and the like.

For example, the CPU 21 controls the entire operations of the computation node 2. A device for controlling the entire operations of the computation node 2 is not limited to the CPU 21, but may be any one of, for example, an MPU, a DSP, an ASIC, a PLD, and an FPGA. Further, the device for controlling the entire operations of the computation node 2 may be a combination of two or more of a CPU, an MPU, a DSP, an ASIC, a PLD, and an FPGA.

The computation nodes 2 communicate with each other independently through the NI 24 and the BI 23. When the BI 23 is not provided in each computation node 2, for example, the same function as the BI 23 may be realized by the firmware of the NS 3.

A case will be described in which, when a parallel job is executed in the MPI library, the parallel job being executed (in other words, an MPI program) is temporarily stopped. When the swap-out execution request for the job is issued from a component for managing a job to a component for managing a resource, the component for managing a resource issues a job deactivation request to a swap library of all the computation nodes used by the job. Accordingly, a swap-out process for the job is started by the thread dedicated to the swap-out process in each node. At this time, in a case where communication is performed between the computation nodes by the MPI, a new issue of the one to-one communication or the barrier communication is stopped. The swap-in traces the reverse of the swap-out to restart the stopped job.

In the one-to-one data communication, since whether or not a partner has received the transmitted data may be identified using the communication library, a stopping process is performed after waiting for the reception identification, and at this time, information on the node is stored, so that the restart position may be uniquely determined regardless of the states of other nodes.

Figure 4:
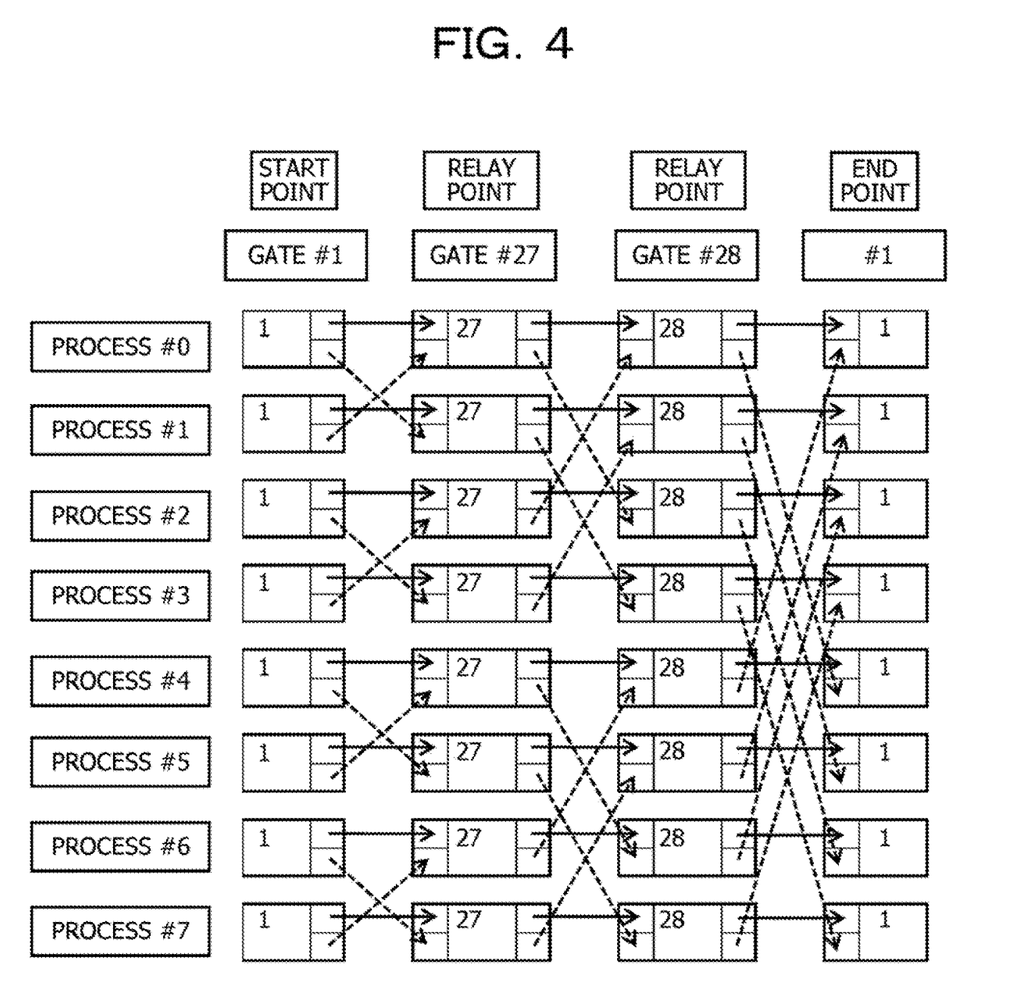
FIG. 4 illustrates an example in which barrier communication is completed in all processes in a barrier network according to a related example.

FIG. 4 illustrates an example in which the barrier communication is completed in all processes in a barrier network according to a related example.

In an example illustrated in FIG. 4, one process is running on one computation node. The BI includes a plurality of gates which are mechanisms for performing transmission and reception and waiting through the barrier communication. The gates include a gate serving as a start point and an end point and a gate serving as a relay point, and in each gate, transmission and reception between an own process gate and another process gate are combined with each other. The gate waits for reception from the own process gate and reception from another process gate, and performs transmission to a next gate.

In many cases, the communication library sets a transmission destination and a reception destination (in other words, a node number and a gate number) for each gate. Then, the barrier communication is issued from a start point gate (in the illustrated example, gate #1), and the completion of the barrier communication is identified at an end point gate (in the illustrated example, gate #1).

In the barrier communication, when a network dedicated to the barrier communication is constructed, and the communication library starts communication, transmission and reception in hardware or firmware are repeated, and in many cases, the communication library does not concern how far the barrier communication has been progressed. That is, the communication library may not identify a state or the like of the barrier communication at relay gates (in the illustrated example, gates #27 and #28).

Figure 5:
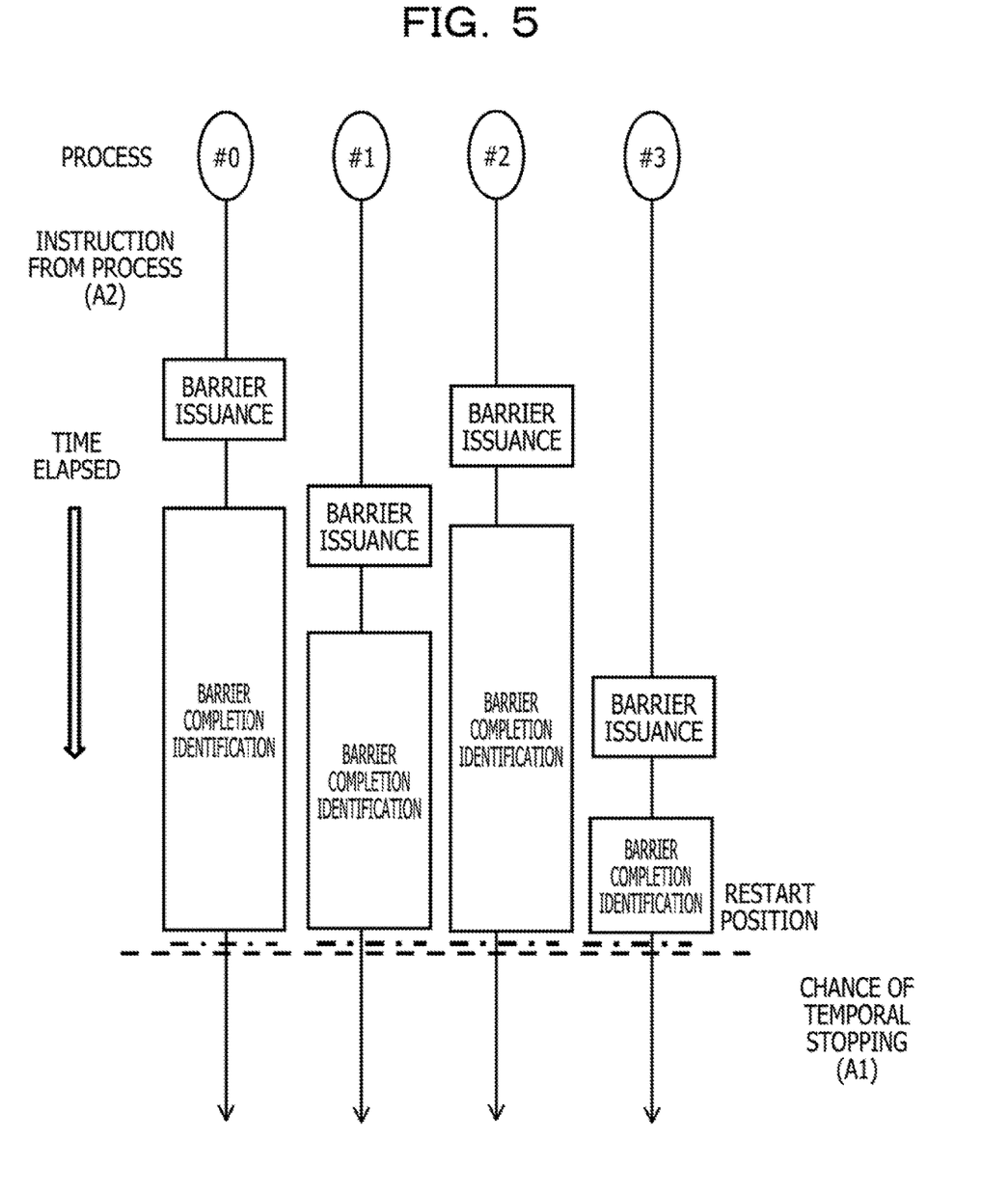
FIG. 5 is a diagram illustrating a process of restarting the barrier communication in the barrier network according to the related example.
Figure 6:
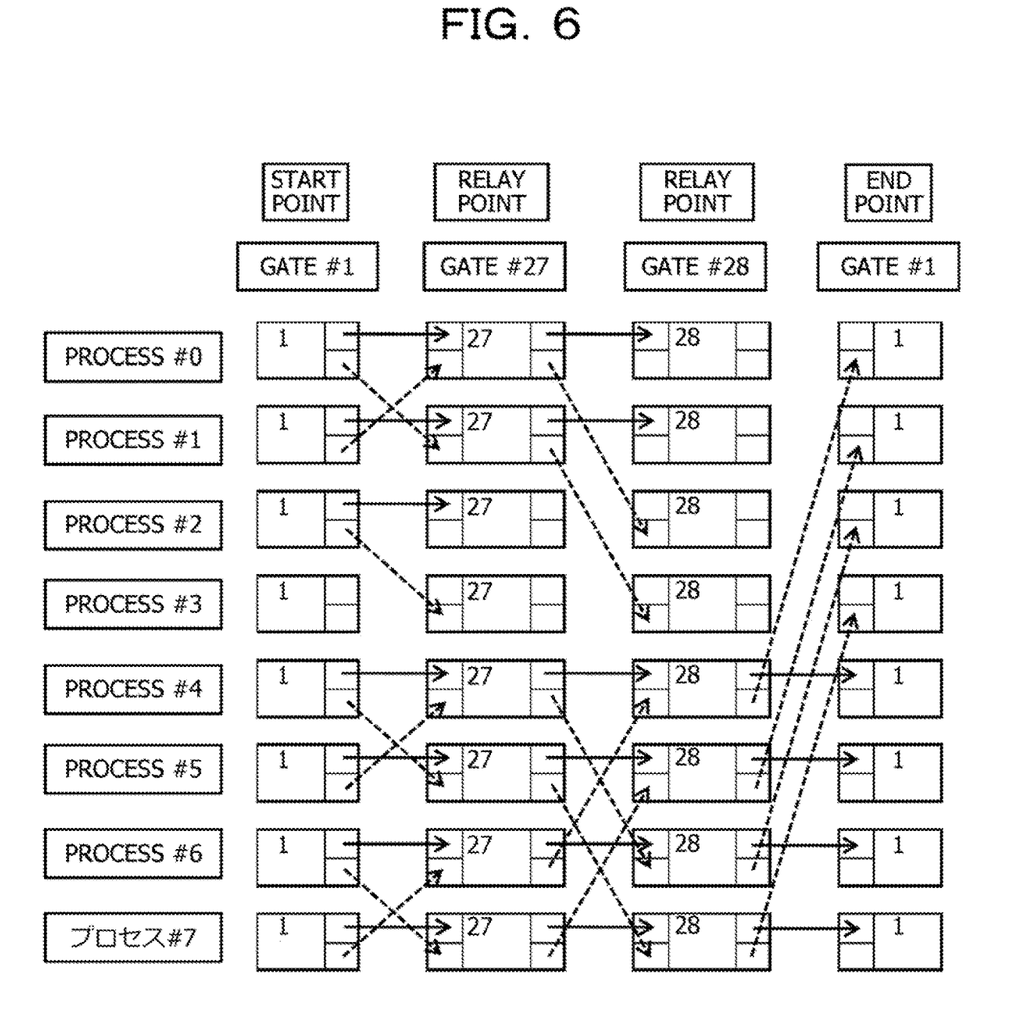
FIG. 6 illustrates an example in which the barrier communication is not completed in all the processes in the barrier network according to the related example.

FIG. 5 is a diagram illustrating a process of restarting the barrier communication in the barrier network according to the related example. FIG. 6 illustrates an example in which the barrier communication is not completed in all the processes in the barrier network according to the related example.

When it is instructed to temporarily stop the barrier communication, as illustrated in FIG. 5, if the barrier communication is issued by all the processes at a chance of the temporal stopping (see symbol A1) (see symbol A2), the barrier communication completely reaches the end point gate as illustrated in FIG. 4.

Meanwhile, as illustrated in FIG. 6, it is assumed that there is a process (in the illustrated example, a node in which process #3 is running) in which the barrier communication is not issued at the chance of the temporal stopping. In this case, a communication wait occurs in somewhere in the relay gates (in the illustrated example, the gates #27 and #28) from a process for which the barrier communication is not issued, and the barrier communication does not reach the end point gate. At this time, the communication library may not acquire and store information on the barrier communication in a middle of a process performed by hardware or firmware of the relay gates (in the illustrated example, the gates #27 and #28) of each process.

Therefore, since it is not possible to determine at which relay gate the barrier communication is stopped, the states of each other are notified to each other through communication, and it is required to determine whether or not to stop the barrier communication without being completed or to determine the restart position.

As described above, in the related example, after the barrier communication is stopped by the hardware during job swapping, each process identifies the states of all the processes included in a barrier issuance group between the processes, and determines the restart position when the barrier communication is stopped without being completed or is reissued. However, in an example of the embodiment, the identification processing of the states of all the processes may not be performed.

Figure 7:
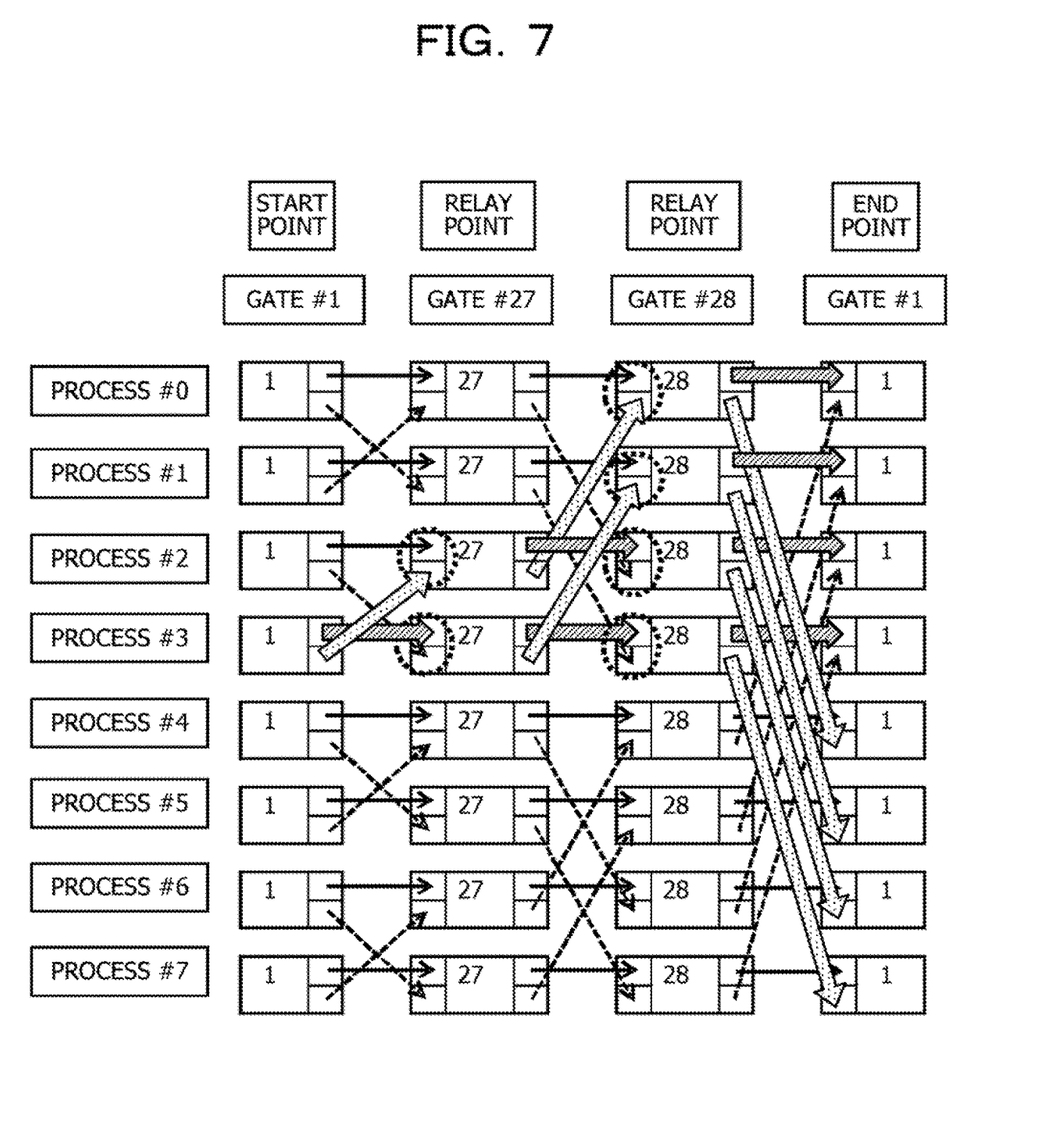
FIG. 7 illustrates an example in which the barrier communication is completed, due to occurrence of an error, in all the processes in the barrier network in the information processing system illustrated in FIG. 1.

FIG. 7 illustrates an example in which the barrier communication is completed, due to occurrence of an error, in all the processes in the barrier network in the information processing system 100 illustrated in FIG. 1.

When a swap-out instruction is issued, as illustrated in the drawing, a thread, which performs swap processing at a process #3 in which the barrier communication is not issued, issues error-type barrier communication. When waiting for the barrier communication (see a solid arrow) from the own process and the barrier communication (see a dashed arrow) from another process, if one or both thereof receive the error type barrier communication (see a dashed circle), the error type barrier communication is also issued in subsequent barrier communication. Therefore, the barrier communication is completed at the end point gates of all the processes due to an error.

Figure 8:
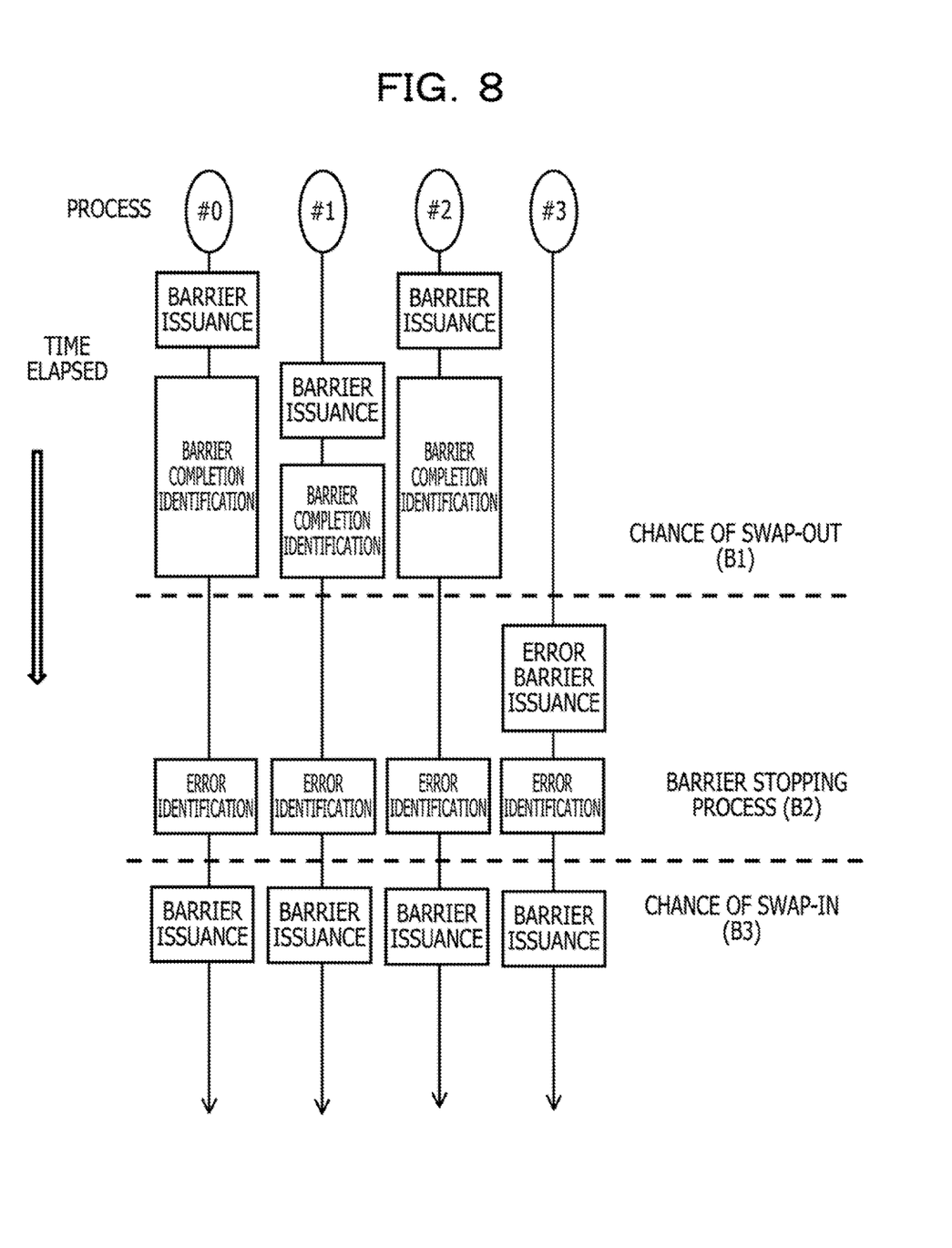
FIG. 8 is a diagram illustrating the process of restarting the barrier communication after an error occurs in the barrier network in the information processing system illustrated in FIG. 1.

FIG. 8 is a diagram illustrating the process of restarting the barrier communication after an error occurs in the barrier network in the information processing system 100 illustrated in FIG. 1.

In the illustrated example, since processes #0 to #2 do not issue a barrier at a chance at which a process #3 is swapped out (see symbol B1), the barrier is not completed even after waiting. Here, the process #3 may issue an error-type barrier so as to completely and safely stop the barrier (see symbol B2). After a chance of the swap-in (see symbol B3), the processes #0 to #2 that have issued the barrier reissue the barrier, and the process #3 is restarted from the issuance of the barrier.

The swap instruction unit 212 functions as an example of an instruction unit that gives an instruction to issue the barrier communication of error information. Further, the swap processing unit 213 functions as an example of a processing unit that propagates the error information to each of the other computation nodes 2 based on the instruction of the barrier communication.

The swap instruction unit 212 may give an instruction to issue the barrier communication of the error information when the barrier communication is not issued in the own computation node 2. Further, the swap processing unit 213 may stop the barrier communication due to an error after the error information is propagated.

When the barrier communication of the error information is issued in another computation node 2, the swap processing unit 213 may stop the barrier communication due to an error.

When the swap-out instruction is issued, since the process #3 has not issued the barrier communication, the process #3 issues the error type barrier communication to complete the barrier communication. When a swap-in instruction is issued, the barrier communication is reissued in all the processes, so that the process is restarted from an interrupted position.

Figure 9:
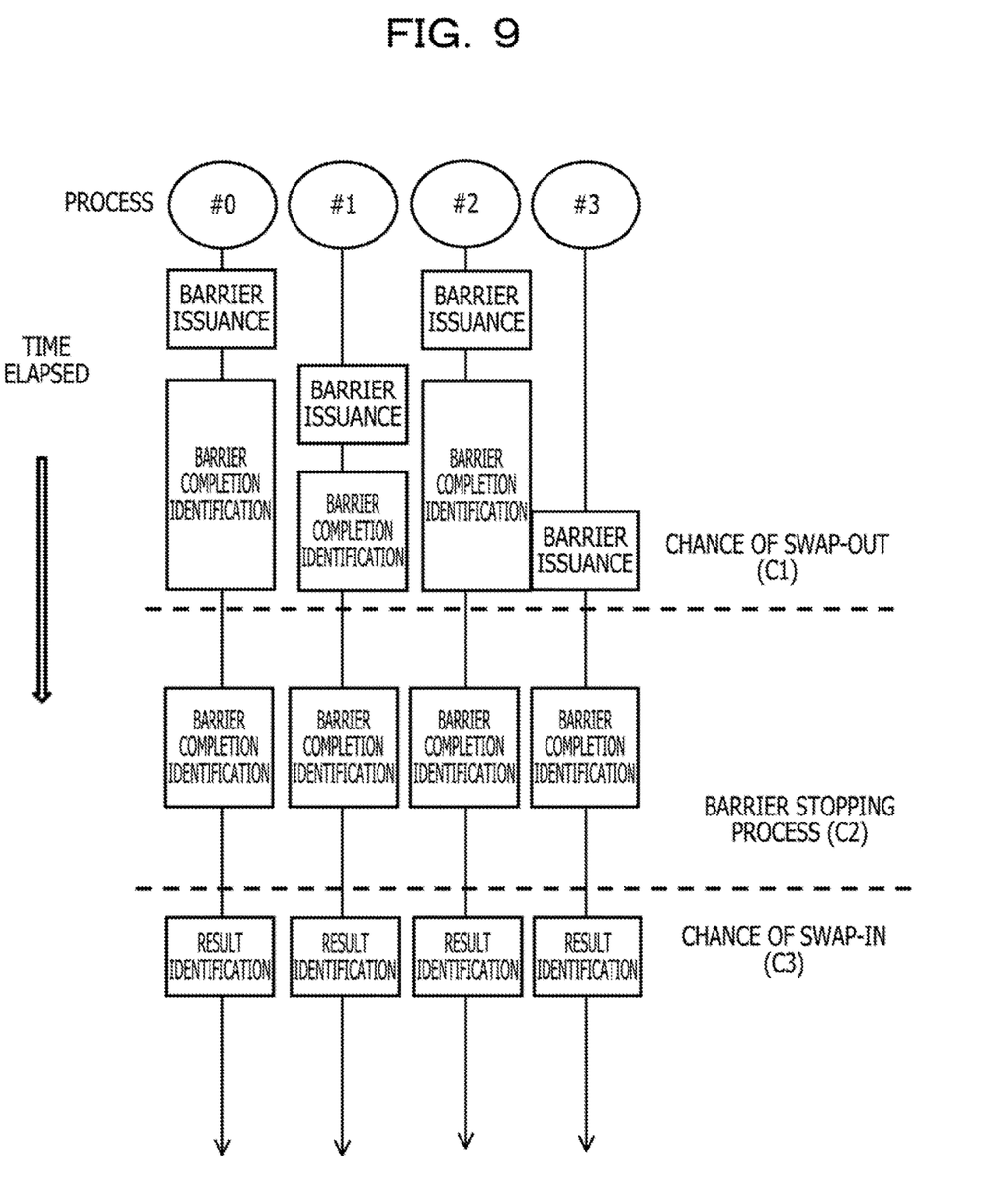
FIG. 9 is a diagram illustrating the process of restarting the barrier communication when no error occurs in the barrier network in the information processing system illustrated in FIG. 1.

FIG. 9 is a diagram illustrating the process of restarting the barrier communication when no error occurs in the barrier network in the information processing system 100 illustrated in FIG. 1.

In the illustrated example, since all the processes #1 to #4 issue the barrier to the chance of the swap-out (see symbol C1), the barrier is eventually completed. Then, after the chance (see symbol C3) of the swap-in of a barrier stopping process (see symbol C2), the process is restarted from identification of a result of the barrier.

That is, the swap processing unit 213 may normally stop the barrier communication when the barrier communication of the error information is not issued in the own computation node 2 or the other computation node 2.

When the swap-out instruction is issued, since all the processes issue the barrier communication, the barrier communication is completed if a user waits. In such a case, a result of the barrier may be identified when the swap-in instruction is issued.

[A-2] Operation Example

Figure 10:
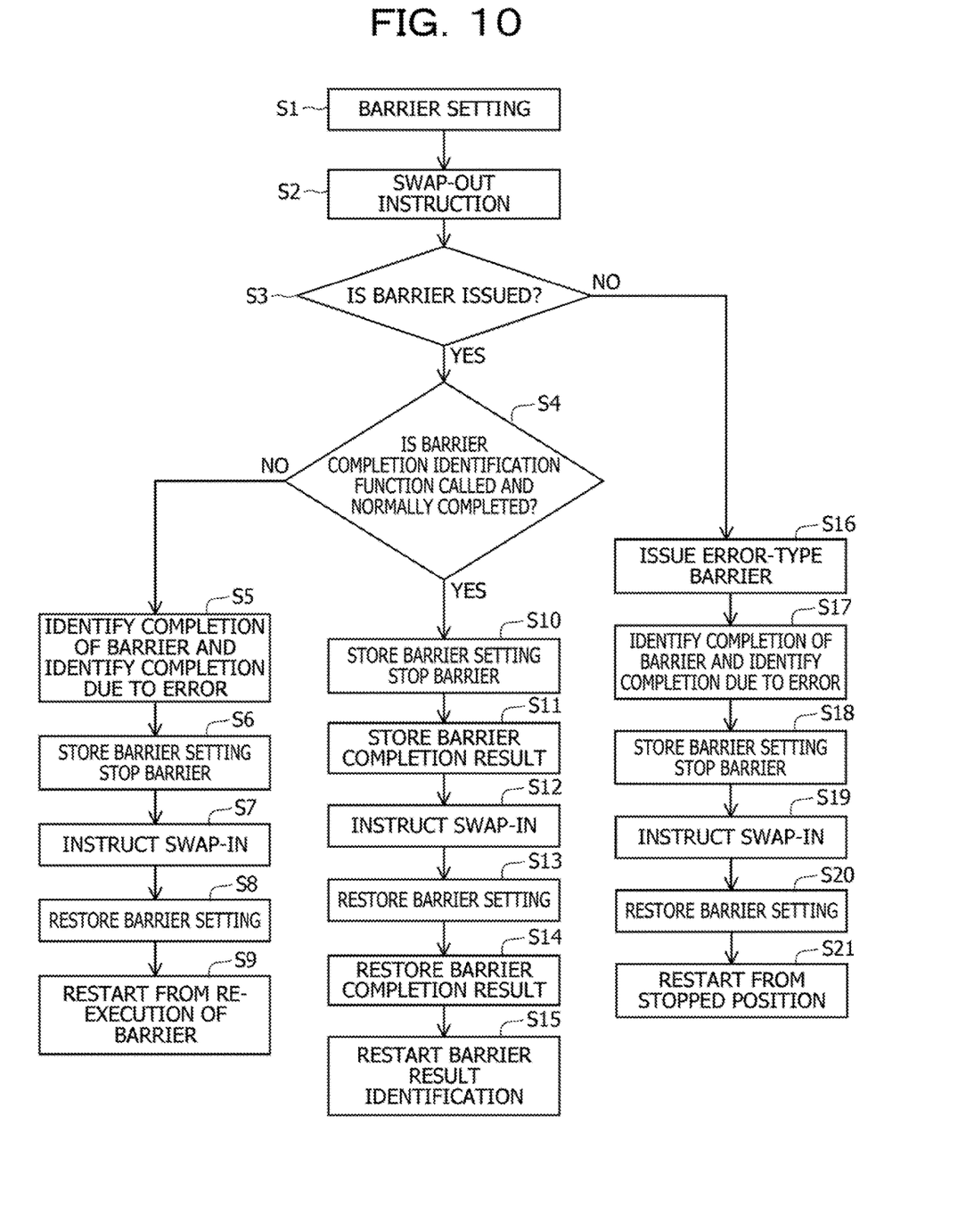
FIG. 10 is a flowchart for explaining the process of restarting the barrier communication in a computation node illustrated in FIG. 1.

The process of restarting the barrier communication in the computation node 2 illustrated in FIG. 1 will be described with reference to a flowchart (steps S1 to S21) illustrated in FIG. 10.

The resource management unit 211 receives information on setting of the barrier communication from the resource management node 1 (step S1).

The swap instruction unit 212 receives a swap-out instruction from the resource management node 1 (step S2).

The swap processing unit 213 determines whether or not a barrier is issued in its own node (step S3).

When the barrier is issued (see a Yes route in step S3), the swap processing unit 213 calls a completion identification function for the barrier, and determines whether or not the barrier is normally completed (step S4).

When the completion identification function for the barrier is not called or the barrier is not normally completed (see a No route in step S4), the swap processing unit 213 identifies the completion of the barrier and identifies the completion due to an error (step S5).

The swap processing unit 213 stores barrier setting and stops the barrier (step S6).

The swap instruction unit 212 receives a swap-in instruction from the resource management node 1 (step S7).

The swap processing unit 213 restores the barrier setting (step S8).

The swap processing unit 213 restarts the process from re-execution of the barrier (step S9). Then, the process of restarting the barrier communication is terminated.

In step S4, when the completion identification function for the barrier is called and the barrier is normally completed (see a Yes route in step S4), the swap processing unit 213 stores the barrier setting and stops the barrier (step S10).

The swap processing unit 213 stores a completion result for the barrier (step S11).

The swap instruction unit 212 receives a swap-in instruction from the resource management node 1 (step S12).

The swap processing unit 213 restores the barrier setting (step S13).

The swap processing unit 213 restores the completion result for the barrier (step S14).

The swap processing unit 213 restarts the process after the identification of the result of the barrier (step S15). Then, the process of restarting the barrier communication is terminated.

In step S3, when the barrier is not issued (see a No route in step S3), the swap processing unit 213 issues an error-type barrier (step S16).

The swap processing unit 213 performs a completion result for the barrier, and identifies that the process is completed due to an error (step S17).

The swap processing unit 213 stores the barrier setting and stops the barrier (step S18).

The swap instruction unit 212 receives a swap-in instruction from the resource management node 1 (step S19).

The swap processing unit 213 restores the barrier setting (step S20).

The swap processing unit 213 restarts the process from the stopped position (step S21). Then, the process of restarting the barrier communication is terminated.

Next, a process of stopping the barrier communication in the information processing system 100 illustrated in FIG. 1 will be described with reference to a flowchart (symbols D1 to D16) illustrated in FIG. 11.

Figure 11:
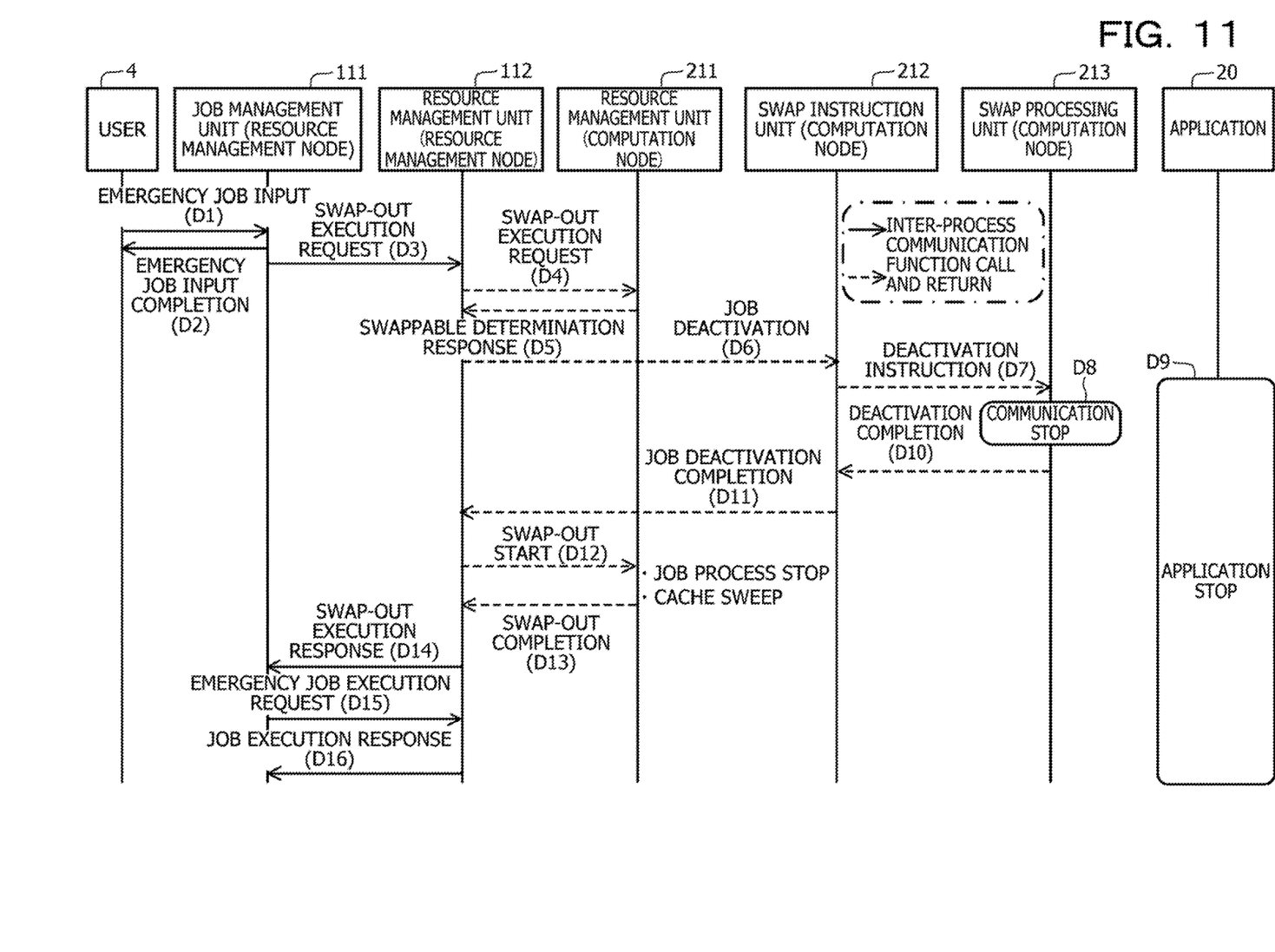
FIG. 11 is a flowchart for explaining a process of stopping the barrier communication in the information processing system illustrated in FIG. 1.

In FIG. 11, a solid arrow indicates an inter-process communication and a dashed arrow indicates a call function or return. An application 20 is executed in the computation node 2.

The user 4 inputs an emergency job to the resource management node 1 (see symbol D1).

The job management unit 111 of the resource management node 1 returns the completion of the input of the emergency job to the user 4 (see symbol D2).

In the resource management node 1, the job management unit 111 issues a swap-out execution request to the resource management unit 112 (see symbol D3).

The resource management unit 112 of the resource management node 1 executes swappable determination on the resource management unit 211 of the computation node 2 (see symbol D4).

The resource management unit 211 of the computation node 2 performs a response of swappable determination to the resource management unit 112 of the resource management node 1 (see symbol D5).

The resource management unit 112 of the resource management node 1 causes the swap instruction unit 212 of the computation node 2 to deactivate the job (see symbol D6).

The swap instruction unit 212 instructs the swap processing unit 213 to deactivate the job (see symbol D7).

The swap processing unit 213 stops the barrier communication (see symbol D8).

Accordingly, the application 20 is stopped (see symbol D9), and the information of the memory 22 is saved in a storage device (not illustrated) such as a hard disk. Further, resources of the memory 22, the CPU 21, and the like, which have been used, are released, and the emergency job may be used.

The swap processing unit 213 responds to the swap instruction unit 212 with the completion of the deactivation of the job (see symbol D10).

The swap instruction unit 212 responds to the resource management unit 112 of the resource management node 1 with the completion of the deactivation of the job (see symbol D11).

The resource management unit 112 of the resource management node 1 instructs the resource management unit 211 of the computation node 2 to start swap-out (see symbol D12).

Accordingly, the resource management unit 211 of the computation node 2 stops the job process and sweeps out a cache, and responds to the resource management unit 112 of the resource management node 1 with the completion of the swap-out (see symbol D13).

The resource management unit 112 of the resource management node 1 responds to the job management unit 111 to execute the swap-out (see symbol D14).

The job management unit 111 issues an emergency job execution request to the resource management unit 112 (see symbol D15).

The resource management unit 112 responds to the job management unit 111 with execution of the emergency job (see symbol D16). Then, the process of stopping the barrier communication is terminated.

[A-3] Effects

According to the computation node 2 in an example of the embodiment, for example, the following effects may be obtained.

The swap instruction unit 212 gives an instruction to issue the barrier communication of the error information. Further, the swap processing unit 213 propagates the error information to each of the other computation nodes 2 based on the instruction of the barrier communication.

Accordingly, since a barrier communication stopping notification is executed not by inter-node communication but by a barrier communication mechanism, the barrier communication may be stopped at a high speed. Further, a job swapping process may be simplified, and the barrier communication may be safely stopped and restarted.

When the barrier communication is not issued in the own computation node 2, the swap instruction unit 212 instructs to issue the barrier communication of the error information. Further, the swap processing unit 213 stops the barrier communication due to an error after the error information is propagated.

Accordingly, when the barrier communication is not issued in the own computation node 2, the barrier communication in the other computation nodes 2 may be safely stopped at a high speed.

When the barrier communication of the error information is issued in other computation nodes 2, the swap processing unit 213 stops the barrier communication due to an error.

Accordingly, when the barrier communication is issued in the own computation node 2, the barrier communication in the own computation node 2 may be safely stopped at a high speed.

The swap processing unit 213 normally stops the barrier communication when the barrier communication of the error information is not issued in the own computation node 2 or other computation nodes 2.

Accordingly, even when no error occurs in each computation node 2, the barrier communication for the emergency job may be safely stopped at a high speed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus effective to execute a parallel job in coordination with other information processing apparatuses, the information processing apparatus comprising:
 a network interface configured to be coupled to each of the other information processing apparatuses through a first communication line including a network switch;
 a barrier interface configured to be coupled to each of the other information processing apparatuses through a second communication line different from the first communication line; and
 a processor circuitry directly or indirectly coupled to the network interface and the barrier interface, the processor circuitry being configured to:
 in response to receiving of a swap-out instruction for the parallel job, cause the barrier interface to issue an error-type barrier communication signal with respect to the parallel job to each of the other information processing apparatuses through the second communication line, the issuing of the error-type barrier communication signal issued to each of the other information processing apparatuses being configured to cause, by the error type barrier communication signal, the each of the other information processing apparatuses to perform stopping a process of a barrier communication with respect to the parallel job and then resuming, in response to receiving of a swap-in instruction for the parallel job, the process of the barrier communication with respect to the parallel job; and in response to receiving of the swap-in instruction, cause the barrier interface to resume the process of the barrier communication with each of the other information processing apparatuses.

2. The information processing apparatus according to claim 1, wherein the causing the barrier interface to issue the error-type barrier communication signal includes inputting, to the barrier interface in response that a signal of the barrier communication has not been issued from the barrier interface, an instruction to issue the error-type barrier communication signal from the barrier interface, and the processor circuitry causes the barrier interface to stop the process of the barrier communication due to an error after the issuing of the error-type barrier communication signal.

3. The information processing apparatus according to claim 1, wherein in response to receiving of the error-type barrier communication signal, the processor circuitry causes the barrier interface to stop the process of the barrier communication due to an error.

4. The information processing apparatus according to claim 1, wherein the processor circuitry causes the barrier interface to stop the process of the barrier communication in a case where it is detected that no error-type barrier communication signal is issued or received.

5. An information processing system comprising:

a plurality of information processing apparatuses configured to execute a parallel job, at least one of the plurality of information processing apparatuses including:

a network interface configured to be coupled to each of other information processing apparatuses from among the plurality of information processing apparatuses through a first communication line including a network switch, the other information processing apparatuses being the plurality of information processing apparatuses other than the at least one of the plurality of information processing apparatuses;

a barrier interface configured to be coupled to each of the other information processing apparatuses through a second communication line different from the first communication line; and a processor circuitry directly or indirectly coupled to the network interface and the barrier interface, the processor circuitry being configured to:

in response to receiving of a swap-out instruction for the parallel job, cause the barrier interface to issue an error-type barrier communication signal with respect to the parallel job to each of the other information processing apparatuses through the second communication line, the issuing of the error-type barrier communication signal issued to each of the other information processing apparatuses being configured to cause, by the error type barrier communication signal, the each of the other information processing apparatuses to perform stopping a process of a barrier communication with respect to the parallel job and then resuming, in response to receiving of a swap-in instruction for the parallel job, the process of the barrier communication with respect to the parallel job; and in response to receiving of the swap-in instruction, cause the barrier interface to resume the process of the barrier communication with each of the other information processing apparatuses.

6. A non-transitory computer-readable storage medium for storing a communication management program which causes a computer to perform processing, the computer being configured to perform a parallel job in coordination with other information processing apparatuses, the computer including a network interface configured to be coupled to each of the other information processing apparatuses through a first communication line including a network switch, and a barrier interface configured to be coupled to each of the other information processing apparatuses through a second communication line different from the first communication line, the processing comprising:

in response to receiving of a swap-out instruction for the parallel job, causing the barrier interface to issue an error-type barrier communication signal with respect to the parallel job to each of the other information processing apparatuses through the second communication line, the issuing of the error-type barrier communication signal issued to each of the other information processing apparatuses being configured to cause, by the error type barrier communication signal, the each of the other information processing apparatuses to perform stopping a process of a barrier communication with respect to the parallel job and then resuming, in response to receiving of a swap-in instruction for the parallel job, the process of the barrier communication with respect to the parallel job; and in response to receiving of the swap-in instruction, causing the barrier interface to resume the process of the barrier communication with each of the other information processing apparatuses.

* * * * *